United States Patent [11] 3,544,070

| [72] | Inventor | William E. Blume<br>126-13 101 St. Ave., Richmond Hill, New York 11419 |
|---|---|---|
| [21] | Appl. No. | 761,912 |
| [22] | Filed | Sept. 24, 1968 |
| [45] | Patented | Dec. 1, 1970 |

[54] CABLE PULLING SHEAVE
10 Claims, 7 Drawing Figs.
[52] U.S. Cl. .................................................. 254/134.3
[51] Int. Cl. .................................................... E21c 29/16
[50] Field of Search .......................................... 254/134.3,
139(FT), 190, 192, 194; 15/104.16, 104.3

[56] References Cited
UNITED STATES PATENTS
1,351,867  9/1920  Oakes ............................. 254/190
2,695,769  11/1954  Henning ......................... 254/134.3
3,218,033  11/1965  Miller ............................ 254/134.3

Primary Examiner—Robert C. Hiordon
Assistant Examiner—David R. Melton
Attorney—Polachek and Saulsbury ABSTRACT: Manhole sheave assemblies are described for use in pulling cables through ducts and manholes. One assembly has two frameworks. An upper framework carrying a sheave mounts on the chimney of a manhole while a lower framework carrying another sheave is disposed inside the manhole and is adjustably supported by the upper framework. The pulled cable is entrained on both sheaves. In another assembly, the lower framework is replaced by a sheave and wedge assembly including wedge blocks which can be anchored in a duct in a wall of the manhole.

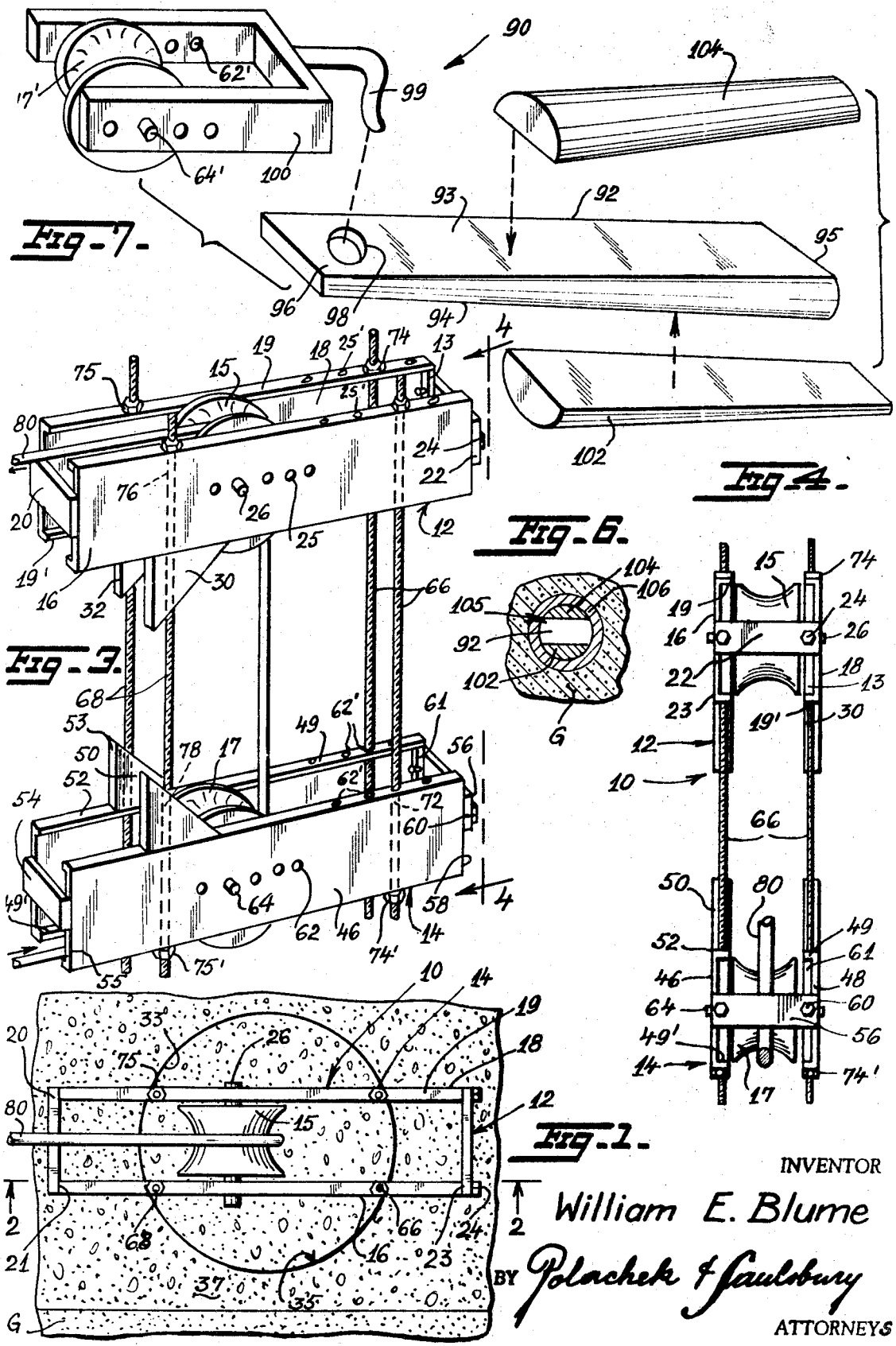

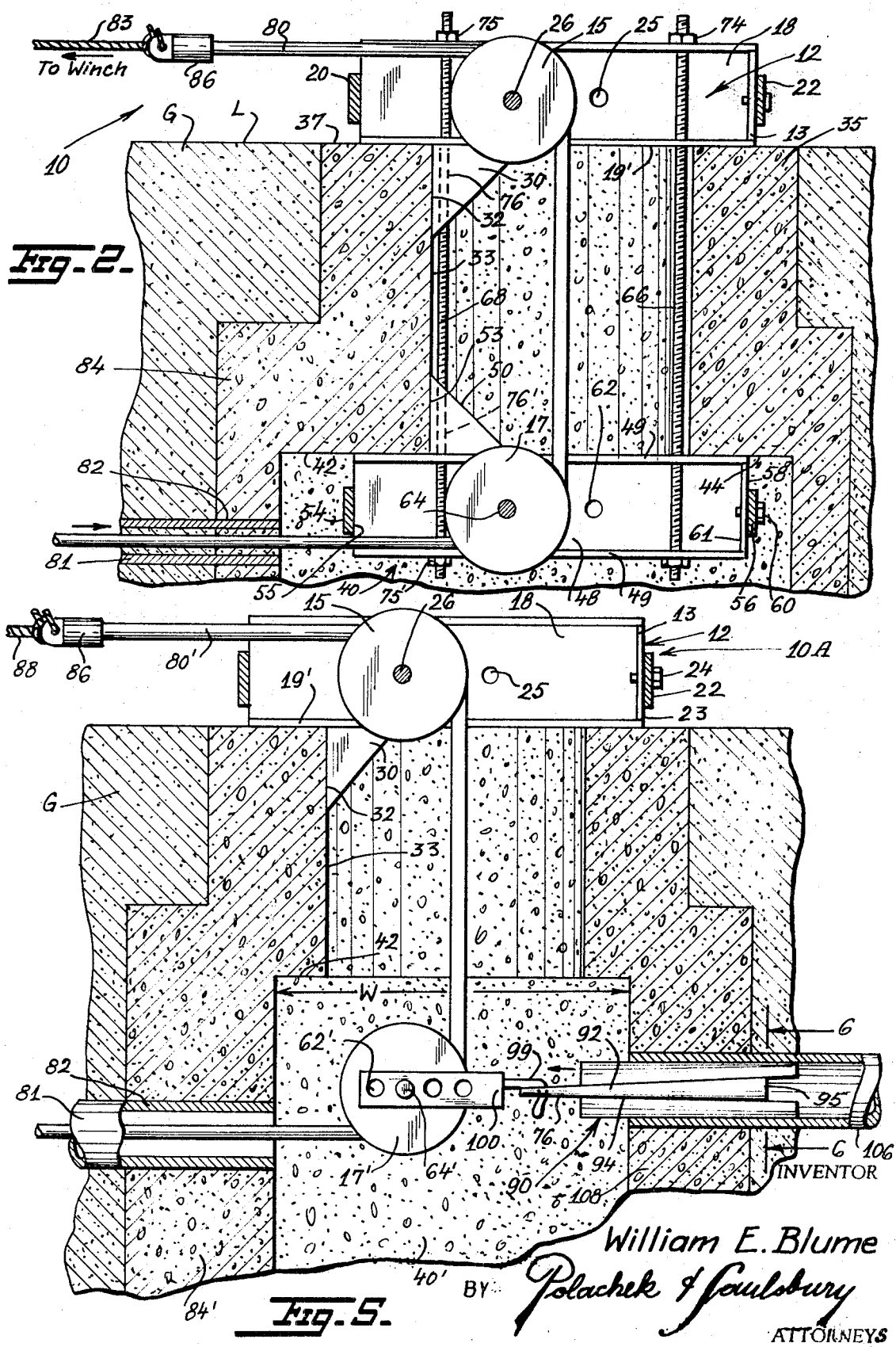

CABLE PULLING SHEAVE

The invention relates to the art of cable pulling devices and more particularly concerns manhole sheave assemblies which are quickly but removably installed at a manhole for pulling cable therethrough.

Heretofore cable drawing systems have employed sheaves which were anchored to bolts permanently set in the walls of manholes. Such bolts frequently pulled loose since they could not stand the high tensional forces generated in pulling cable through long ducts communicating between the manholes. Various power pullers for pulling have also been proposed equipped with pulley or sheave blocks and sheave stands. These were complex in construction, expensive, heavy and limited to use in shallow manholes.

The present invention is directed at a manhole sheave assembly which can be used in association with an external winch mounted on a nearby truck or other support. The assembly includes a framework unit which overlays the chimney of a manhole with a rotatable sheave disposed over the manhole. Another similar framework is disposed inside the manhole and supported by the first framework. Both frameworks have abutment plates which bear against walls of the chimney and manhole so that these walls bear the full counter forces generated while pulling the cables through ducts leading into the manhole. The assembly is quickly removable from the manhole after pulling of the cable is completed. For shallow manholes, only the top framework unit may be required. Also, a tapered wedge block assembly is provided to fit into a duct. The wedge block assembly anchors itself in the duct. A sheave is attached to a central wedge which extends outwardly of the wedge block assembly.

For further comprehension, and for a better understanding of the invention, reference may be had to the following detailed description taken in connection with the accompanying drawing, in which:

FIG. 1 is a top plan view of a manhole sheave assembly embodying the invention, shown mounted in a manhole; FIG. 2 is a vertical sectional view taken on line 2—2 of FIG. 1;

FIG. 3 is a perspective view of the manhole sheave assembly;

FIG. 4 is an end elevational view taken on line 4—4 of FIG. 3;

FIG. 5 is a sectional view similar to FIG. 2, showing another manhole sheave assembly embodying another form of the invention;

FIG. 6 is a fragmentary sectional view taken on line 6—6 of FIG. 5; and

FIG. 7 is an exploded perspective view of parts of a sheave and wedge block assembly employed in the assembly of FIG. 5.

Referring first to FIGS. 1—4, there is shown a manhole sheave assembly 10 having two similar frameworks 12 and 14 for carrying sheaves 15, 17. Framework 12 includes a pair of rectangular parallel vertically disposed channel plates 16, 18 with horizontal flanges 19, 19'. The plates are joined at opposite ends 21, 23 by cross bars 20, 22. Bar 20 at the rear ends 21 of the plates is welded in place. Bar 22 at the front ends 23 of the plates is secured in place by removable bolts 24 engaged in end flanges 13, so that the bar can be removed for a purpose to be described.

A plurality of space pairs of holes 25 are formed in plates 16, 18 for receiving ends of a shaft 26 carrying grooved pulley or sheave 15. Any of the pairs of holes can be used for rotatably mounting sheaves of different sizes.

Welded to or integrally formed with the plates 16, 18 are triangular abutment plates 30. Each of these abutment plates has a vertical rear end wall 32 to abut the rear vertical wall 33 of a manhole chimney 35. The abutment plates depend from the bottom flanges 19' of plates 16, 18 and extend into the manhole chimney. End walls 32 of the abutment plates are spaced forwardly from the rear ends 21 of plates 16, 18. The bottom flanges 19' of plates 16, 18 rest on the front and rear walls 33, 34 of the chimney and extend across the top 37 of the chimney. Sheave 15 is rotatably supported in a vertical plane above the top 37 of the chimney and above level L of ground G. The chimney 35 communicates with manhole 40 which is wider than the chimney to define horizontal shoulders 42, 44 at rear and front ends of the manhole.

Framework 14 also includes a pair of rectangular vertical plates 46, 48 with horizontal flanges 49, 49'. Plates 46, 48 have triangular abutment plates 50 on top flanges 49 of the plates. The abutment plates 50 have straight, vertical flat faces 53 which abut the rear wall 33 of the chimney into which the abutment plates extend while the opposite ends of top flanges 49 abut shoulders 42, 44. Bar 54 at the rear ends 55 of the plates 46, 48 is permanently secured while bar 56 at front ends 58 is removably secured by bolts 60 engaged with end flanges 61. A plurality of holes 62 and 62' are provided in the two plates. Any pair of these holes 62 receives shaft 64 which carries grooved rotatable pulley or sheave 17. Slip holes 25' and 62' in flanges of channel plates permit adjustment of rods 66 to adapt the framework to different sizes of manhole cover frames.

In order to support the lower frame work 14 which is located inside the manhole, there are provided two pairs of threaded rods or bolts 66, 68. The front pair of rods or bolts 68 extend through slip holes in flanges 19, 19' of plates 16, 18 and through alined slip holes in flanges 49, 49' of plates 46, 48. Hexagonal nuts 74, 74' are provided at opposite ends of rods 68. The front pair of rods or bolts 68 extend through slip holes in flanges 19, 19' of plates 16, 18 and through alined holes 76 in abutment plates 30, so that the rods or bolts 68 are located just inside of the chimney wall 33. The rods or bolts 66 extend through slip holes 76' in abutment plates and alined holes in the flanges 49, 49' of plates 46, 48. Hexagonal nuts 75, 75' are provided at opposite ends of the threaded rods 68. The nuts engage on the top flanges 19 of upper plates 16, 18 and on the bottom flanges 49' of lower plates 46, 48. These nuts can be turned for raising or lowering the lower framework 14. When the nuts are fully tightened the upper flanges 49 of plates 46, 48 abut the undersides of shoulders 42, 44 or the roof of the manhole, or any spacers which may be provided to bring sheave 17 in line with a duct through which a cable will be pulled, see FIG. 2.

A cable 80 to be pulled extends through duct 81 in ground G and hole 82 formed in manhole wall 84, then around the bottom and front side of sheave 17, up through the chimney 35 and then around and over sheave 15. The cable extends rearwardly of the assembly 10 and may terminate in an eye 86 to which may be attached winch cable 88 engaged on a pulling winch (not shown).

By the arrangement described, the cable can be pulled with minimum effort in a vertical plane around the sheaves which are alined in a vertical plane. After the cable is fully pulled, the assembly 10 can be left in place. If it is to be removed, the end bars 22 and 56 can be removed so that the frameworks can be lifted clear of the cable even while it is still engaged by the winch. There is sufficient clearance between the sides of the manhole chimney and the sides of the frameworks to permit a worker to climb down into the manhole to rear bar 56 for removing bolts 60, 74' and 75'. Lower framework 14 can be pulled out of the manhole by the same winch which pulls cable 80 after bolts 74', 75' are disengaged from rods 66, 68.

During the cable pulling operation, the abutment plates 30 and 50 will bear against wall 33 to resist the pulling force of the winch while the cable passes continuously around the rotating sheaves to the winch. At the same time, the plates 16, 18 are forced down on the top 37 of the chimney 35 while the plates 46, 48 are pulled up against the shoulders 42, 44 or roof of the manhole. It will be noted that no permanent fixtures need be installed in the manhole to install the cable pulling assembly. The assembly is adapted for use with different depth and diameters of manhole chimneys. The assembly can be used in a manhole of any width greater than the length of plates 46, 48 and of any depth since operation and mounting of the assembly is actually independent of the manhole dimensions.

If desired, shims, spacers or blocks (not shown) can be inserted between the top flanges 49 of the lower plates 46, 48 and the undersides of shoulders 42, 44. However, nuts 74', 75' on rods 66 and 68 can be tightened to take up any looseness which may develop between the framework 14 and shoulders 42, 44.

FIG. 5 shows another manhole sheave assembly 10A. Parts corresponding to those of FIGS. 1—4 are identically numbered. Framework 12 is used in assembly 10A but in place of the lower framework 14 of assembly 10 there is provided a sheave and wedge block assembly 90. The wedge block assembly shown in FIGS. 5, 6 and 17 has a central wedge 92 with flat opposing sides 93, 94. The wedge tapers from its wider rear end 95 forwardly to its front end 96. In front end 96 is a hole 98 which receives a hook 99 or a ring formed on the end of sheave bracket 100. The sheave bracket carries a sheave 17' rotatably supported by shaft 64' inserted in any pair of holes 62 which may be desired.

Abutting opposite sides of central wedge 92 are two tapered wedges 102, 104. The three wedges define sections of a cylindrical block 105 which can fit slidably into duct 106 extending through wall 108 of manhole 40' and opening into the manhole. Since wedges 102 and 104 are tapered oppositely from wedge 92, the wedges 102 and 104 are forced apart when the central wedge 92 is pulled forwardly.

It will be noted that the fore and aft width of manhole 40' is less than the length of framework 12. Framework 14 of assembly 10 is the same length and would not fit under shoulders 42', 44' of manhole 40'. Assembly 90, however, provides an effective substitute for framework 14.

In mounting assembly 90 in duct 106, all three wedges can be abutted and inserted together, a hook or ring 99 will then be engaged on wedge 92. Then cable 80' will be threaded underneath sheave 17' and up through chimney 35' and around and over sheave 15 from which the cable extends forwardly to winch cable 88.

When the winch is pulling the cable, wedge 92 will tend to be pulled rearwardly toward wall 84'. This tends to force wedges 102, 104 apart so that they wedge tightly in duct 108. To loosen wedge 92 after pulling of cable 80' is completed, the wedge is driven slightly further into duct 108. This will loosen all three wedges so they can easily be removed.

The sheave assemblies described are adapted to be used with manholes and manhole chimneys of different sizes. They can be left in place or can be removed quickly and easily at a any time. They are easy to install and require no particular skill for installation or removal. Installation removal is done with simple tools. The sheave assemblies are rugged in construction, relatively inexpensive to manufacture, and will provide long trouble-free service.

While I have shown and described what I believe to be the best embodiments of my invention, it will be apparent to those skilled in the art that various changes and modifications may be made therein without departing from the spirit and scope of the invention as defined in the appended claims.

I Claim:

1. A manhole sheave assembly for drawing cables through a duct opening into a manhole through a wall thereof, said manhole having a chimney at its upper end opening at ground level, said assembly comprising: a framework having a pair of rectangular frame plates, cross bars joining the plates in parallel spaced disposition so that the framework can be extended across the top of the chimney and supported thereby, a sheave disposed between the plates and rotatably supported thereby to rotate in a plane parallel to the plates, and abutment plates depending from said frame plates, said abutment plates having vertical walls spaced from ends of the frame plates to extend into said chimney and to bear against a side of the chimney, whereby a cable can be passed up and around the sheave and drawn outwardly away from said framework while the abutment plates bearing against the side of the chimney resist displacement of the framework on the chimney.

2. A manhole sheave assembly as defined by claim 1, wherein said frame plates have a plurality of spaced holes therein, and a shaft inserted through any selected pair of said holes, said shaft extending axially through and rotatably carrying said sheave.

3. A manhole sheave assembly as defined by claim 2, wherein at least one of said cross bars is removably disposed at one end of the frame plates to facilitate entraining said cable on said sheave and removing the cable therefrom.

4. A manhole sheave assembly as defined by claim 1, further comprising another framework carrying another rotatable sheave, said other framework being disposable inside the manhole with said other sheave disposed in alinement with the first sheave so that said cable can be entrained around both sheaves in being drawn through said duct and up through the manhole and chimney.

5. A manhole sheave assembly as defined by claim 4, further comprising means connecting both frameworks so that the first named framework supports said other framework.

6. A manhole sheave assembly as defined by claim 4, further comprising means for anchoring said other framework at a wall of the manhole to resist forces drawing the cable around the sheaves.

7. A manhole sheave assembly as defined by claim 1, further comprising another framework having another pair of rectangular frame plates for extending across the manhole and bearing against shoulders defined between said chimney and said manhole, other cross bars joining the other frame plates in parallel spaced disposition in alinement with the first named frame plates, another sheave carried by said other frame plates in alinement with the first named sheave, and other abutment plates extending upwardly from said other plates for bearing against said side of the chimney to resist displacement of said other framework while said cable is entrained around the sheaves of both frameworks and is drawn through said duct and out of the manhole and chimney.

8. A manhole sheave assembly as defined by claim 7, wherein at least one of said other cross bars is removably disposed at one end of said other framework to facilitate entraining said cable on said other sheave and removing the cable therefrom.

9. A manhole sheave assembly as defined by claim 7, further comprising bolts adjustably connecting the frame plates of both frameworks so that said other framework is adjustably supported in the manhole by the first named framework.

10. A manhole sheave assembly as defined by claim 1, further comprising another framework disposable inside said manhole, said other framework comprising three wedges defining sections of a cylindrical block, said wedges being laterally abutted together to fit into another duct in a wall of said manhole, a central one of said wedges being tapered oppositely from the other two so that the wedges are forced apart to anchor in said other duct when the central wedge is pulled axially outwardly of the duct, and another sheave rotatably carried by a bracket engaged with the central wedge, whereby the cable can be entrained around both sheaves and pulled through the first named duct and out of the manhole and chimney, while the wedges are forced apart and are anchored in said other duct to resist forces pulling the cable.